United States Patent
Kimikawa

(10) Patent No.: US 7,173,887 B2
(45) Date of Patent: Feb. 6, 2007

(54) CARRIAGE SERVO METHOD AND APPARATUS FOR DETERMINING AND SETTING A DRIVE SIGNAL

(75) Inventor: Yuichi Kimikawa, Kawagoe (JP)

(73) Assignee: Pioneer Corporation, Tokyo-to (JP)

( * ) Notice: Subject to any disclaimer, the term of this patent is extended or adjusted under 35 U.S.C. 154(b) by 647 days.

(21) Appl. No.: 09/816,234

(22) Filed: Mar. 26, 2001

(65) Prior Publication Data
US 2001/0026509 A1    Oct. 4, 2001

(30) Foreign Application Priority Data
Mar. 24, 2000    (JP)    ............... P2000-88565

(51) Int. Cl.
*G11B 7/00*    (2006.01)
(52) U.S. Cl. .................................. 369/44.14
(58) Field of Classification Search ............ 369/44.11, 369/44.14, 44.17
See application file for complete search history.

(56) References Cited

U.S. PATENT DOCUMENTS

| | | | | |
|---|---|---|---|---|
| 4,375,091 A | * | 2/1983 | Dakin et al. ............. | 369/30.13 |
| 4,581,567 A | * | 4/1986 | Yanagawa et al. .......... | 318/696 |
| 4,647,990 A | * | 3/1987 | Sasamura .................... | 360/70 |
| RE32,574 E | * | 1/1988 | Ceshkovsky et al. .... | 369/30.16 |
| 4,727,532 A | * | 2/1988 | Giddings .................... | 386/70 |
| 4,924,165 A | * | 5/1990 | Kohno ....................... | 318/592 |
| 5,402,400 A | * | 3/1995 | Hamada et al. .......... | 360/78.06 |
| 5,699,207 A | * | 12/1997 | Supino et al. ........... | 360/78.09 |

FOREIGN PATENT DOCUMENTS

| | | |
|---|---|---|
| JP | H05-242492 | 9/1993 |
| JP | H08-103095 | 4/1996 |
| JP | H09-161423 | 6/1997 |
| JP | H11-025474 | 1/1999 |

* cited by examiner

*Primary Examiner*—Gautam R. Patel
(74) *Attorney, Agent, or Firm*—Sughrue Mion, PLLC

(57) ABSTRACT

A carriage servo apparatus according to the present invention comprises: a carriage for supporting a pickup that records or reproduces information relevant to an information recording face; and a carriage motor for moving the carriage in a direction parallel to the information recording face based on a motor drive signal. This carriage servo apparatus further comprises a microcomputer for detecting a minimum value of a motor drive signal required for moving the carriage from its still state, and setting a motor drive signal when recording or reproducing information, based on the detected minimum value.

13 Claims, 10 Drawing Sheets

RELATED ART

CARRIAGE SERVO METHOD AND APPARATUS FOR DETERMINING AND SETTING A DRIVE SIGNAL

BACKGROUND OF THE INVENTION

1. Field of the Invention

The present invention relates to a technical field of a carriage servo apparatus, an information reproduction apparatus and a carriage servo control method. More particularly, the present invention relates to a technical field of a carriage servo apparatus for moving a support member (hereinafter referred to as the "carriage") that moves in a direction parallel to an information recording face while supporting a pickup for optically recording or reproducing information relevant to the information recording face; as well as an information reproduction apparatus having such a carriage servo apparatus and a carriage servo control method.

2. Description of the Related Art

In general, in the case where information is optically recorded or reproduced relevant to an information recording medium such as optical disc, so called servo control is required to ensure that a focusing position of light beams such as the recording or reproduction laser light is precisely coincident with a position of an information track on an information recording face on which the information in the information recording medium is to be recorded or reproduced.

At this time, the servo controls include so called focus servo control for servo controlling coincidence between the focusing position in a direction vertical to the information recording face and an information track position and so called tracking servo control and carriage servo control for servo controlling coincidence between the focusing position in a direction parallel to the information recording face and vertical to the above information track and the information track position.

Here, the carriage servo control denotes servo control executed when a carriage being a support member for supporting a pickup that ejects the above light beams and receives reflection light from the information recording face, and moving in a direction vertical to the above information track (its radial direction in the case of an optical disc) is moved in a direction vertical to the information track.

In addition, with respect to a relationship between the tracking servo control and the carriage servo control, the tracking servo control moves an objective lens in a pickup for focusing the light beams on an information recording face in a direction vertical to an information track, thereby making fine adjustment for a light focusing position. On the other hand, even when an objective lens reaches a movable limit position on a preset design in its movement reaches, in the case where the focusing position is displaced from the information track position, the carriage servo control moves a pickup itself in a direction vertical to the information track, thereby eliminating the displacement between the focusing position in a direction parallel to the information recording face and the information track position.

At this time, with respect to the actual tracking servo control and carriage servo control, specifically based on reflection light of the above light beams, a so called tracking error signal indicating a displacement in a direction vertical to an information track (direction parallel to an information recording face) between the light focusing position and the information track position is first generated by a technique such as 3-beam technique, a 1-beam phase differential technique or heterodyne technique and the like. Then, the tracking servo control and carriage servo control are performed so that a level of this tracking error signal becomes zero.

Here, in a low frequency bandwidth in the tracking error signal (in a bandwidth for a low frequency equal to or smaller than a frequency that corresponds to an eccentricity component in rotation of an optical disc), as shown in FIG. 10(a), there are included an alternating current component that corresponds to the above eccentricity component or the like in the case of the optical disc, on the one hand, and a direct current component generated due to the fact that the information track is formed spirally in the optical disc (that is, due to the fact that the focusing position should be moved in an outside (or inside) direction continuously and gradually together with rotation of the optical disc), on the other hand. At this time, the above carriage servo control is required to eliminate displacement generated beyond the above movable limit in the objective lens, of the positional displacements indicated by the direct current component.

In the actual carriage servo control, this tracking error signal is converted into a waveform suitable to the driving of a drive device such as carriage motor for moving a carriage as shown at the upper part of FIG. 10(b). Then, only the tracking error signal beyond a preset threshold $V_Z$ that corresponds to the above movable limit is defined as a drive signal (refer to the lower part of FIG. 10(b)) to be applied to the drive device, thereby moving a carriage.

When the above movable limit of the objective lens is exceeded, the carriage servo control is executed. Thus, the drive signal is intermittently applied as shown at the lower part of FIG. 10(b). Further, an original tracking error signal produced when the carriage servo control is executed is discontinuously changed along with carriage movement, as shown in FIG. 10(a).

In addition, only a tracking error signal having a level of the threshold $V_Z$ or more after conversion of waveform is applied to the drive device. This is because, in an arrangement for applying all the tracking error signal to a drive device without providing a threshold, application of the tracking error that corresponds to a range in which a carriage cannot be moved becomes wasteful processing, and wasteful power consumption caused by such application occurs.

Further, in the case where the waveform of the above drive signal supplied to the above drive device for moving a carriage (generally, so called DC (direct current) motor is employed.) is formed in a pulse shape as shown in FIG. 10(b), that torque is generally determined in proportion to a current supplied to the drive device. In diagram of this fact, there is an advantage that a pulse shaped drive signal rising steeply like a so called step function rather than that having its waveform gradually rising like a so called ramp function can generate a large current value, and thus, a startup voltage of the drive device can be reduced.

At this time, conventionally, in order to simplify an arrangement, this threshold $V_Z$ is kept identical and unchanged relevant to the same type of servo control device for performing the carriage servo control.

However, in the actual carriage servo control, for example, due to mechanical factors such as stiffness of mating of carriage movement gears or electrical factors such as voltage shift in a drive control device included in a driving apparatus, there is included a significantly large deviation (for example, deviation in individual information reproduction apparatus for performing carriage servo control) in a voltage (hereinafter referred to as the "carriage startup voltage") required to be applied to a driving apparatus when a carriage starts to move.

At this time, in the carriage servo control including such deviation in carriage startup voltage, in the case where the voltage $V_Z$ is constant as described above, for example, even if a carriage startup voltage on design is applied, a carriage does not move. As a result, there has been a problem with unstable operation that a large carriage startup voltage is applied, whereby the carriage moves excessively; even if the same carriage startup voltage is applied, the carriage moves more excessively than a designed value; and excessive power consumption occurs.

This problem leads to a problem that precise carriage servo control is executed as a result of unstable carriage movement, and information cannot be recorded or reproduced precisely.

SUMMARY OF THE INVENTION

The present invention has been made in order to solve the foregoing problems. It is an object of the present invention to provide a carriage servo apparatus, which permits stable performance of carriage servo control, even in the case where a solid difference such as deviation in carriage startup voltage is individually included in a carriage servo control apparatus, as well as an information reproduction apparatus having such a carriage servo apparatus and a carriage servo control method.

In order to solve the foregoing problems, according to a first aspect of the present invention, there is provided a carriage servo apparatus comprising a carriage device for supporting a pickup device for recording or reproducing information relevant to an information recording face and a moving device for moving the carriage device in a direction parallel to said information recording face based on a drive signal, said carriage servo apparatus further comprising: a drive signal detecting device for detecting a minimum value of said drive signal required for moving the carriage device from a still state thereof; and a setting device for setting said drive signal based on said detected minimum value when the information is recorded or reproduced.

According to the present invention, the minimum value of a required drive signal is actually detected, and the drive signal required when recording or reproducing the information is set. Thus, a solid difference individually included in a carriage servo control apparatus is compensated for, and carriage servo control can be stably executed based on a drive signal of a proper value.

Therefore, when the information is recorded or reproduced relevant to an information recording face, even in the case where the solid difference is included in the carriage servo control apparatus, the carriage servo control is stabilized, and the recording or reproduction can be executed precisely.

In order to solve the foregoing problems, according to a second aspect of the present invention, there is provided a carriage servo apparatus according to the first aspect, wherein recording or reproducing said information is executed by emitting light beams to an information track on said information recording face, said servo control device further comprising an applying device for, in recording or reproducing the information, when a value of an error signal indicating displacement of an emission position of said light beams relative to said information track on said information recording face in a parallel direction to said direction is equal to or greater than a threshold set based on said minimum value, applying said drive signal set to said moving device.

According to the present invention, when a value of an error signal is equal to or greater than a threshold, a solid difference individually included in a carriage servo control apparatus is compensated upon the applying of the drive signal, and carriage servo control can be stably executed based on the drive signal of a proper value.

In order to solve the foregoing problems, according to a third aspect of the present invention, there is provided a carriage servo apparatus according to the first or second aspect, wherein said drive signal detecting device comprises: a stillness detecting device for detecting whether or not said carriage device is still; and a minimum drive signal applying device for, while changing a value of said drive signal in a state in which the carriage device is still, applying the drive signal to said moving device, the drive signal value applied when said stillness detecting device detects start of movement of said carriage device due to the applying of said drive signal is defined as said minimum value.

According to the present invention, a value of the drive signal obtained when a carriage device starts movement from its still state is defined as a minimum value, and a drive signal obtained when actually recording or reproducing information is set. Thus, a proper minimum value can be set with a simple arrangement.

In addition, a conventional existing member can be employed as a sensing device, and thus, the above effect can be achieved without making any major constitutional change.

In order to the foregoing problems, according to a fourth aspect of the present invention, there is provided a carriage servo apparatus according to the first or second aspect, wherein said drive signal detecting device comprises: a stillness detecting device for detecting whether or not said carriage device is still; and a minimum drive signal applying device for, while changing a value of said drive signal in a state in which the carriage device is still, applying the drive signal to said moving device, the drive signal value applied when said stillness detecting device detects start of movement of said carriage device due to the applying of said drive signal is defined as said minimum value.

According to the present invention, a value of the drive signal obtained when it is sensed that a carriage device starts movement from its still state according to whether or not a light focusing device vibrates, is defined as a minimum value, and thus, a proper minimum value can be set with a simple arrangement.

In order to solve the foregoing problems, according to a fifth aspect of the present invention, there is provided a carriage servo apparatus according to the fourth aspect, wherein said pickup device comprises a light receiving device for receiving reflection light of said light beams from said information recording face, and wherein said sensing device senses the vibration of said light focusing device due to change in emission position on said light receiving device for the reflection light.

According to the present invention, vibration of a light focusing device can be sensed without adding a new member.

In order to solve the foregoing problems, according to a sixth aspect of the present invention, there is provided a carriage servo apparatus comprising a carriage device for supporting a pickup device for recording or reproducing information relevant to an information recording face and a moving device for moving said carriage device in a direction parallel to said information recording face based on a drive signal, said carriage servo apparatus further comprising: an applying time detecting device for detecting an applying time during which said drive signal is applied to said moving device; and a setting device for setting said drive signal based on said applying time detected.

According to the present invention, an applying time of the drive signal is actually detected, and the drive signal is set based on the detection. Thus, a solid difference individually included in a carriage serve control device is compensated, and the carriage servo control can be safely executed based on the drive signal of a proper value.

Therefore, in recording or reproducing information relevant to an information recording face, even in the case where a solid difference is included in the carriage servo control apparatus, the carriage servo control is stabilized, and the recording or reproduction can be precisely executed.

In order to solve the foregoing problems, according to a seventh aspect of the present invention, there is provided a carriage servo control apparatus according to the sixth aspect, wherein recording or reproducing said information is executed by emitting light beams to said information recording face, said servo control device further comprising an applying device for, in recording or reproducing the information, when a value of an error signal indicating displacement between an emission position of said light beams and a position of an information track on said information recording face in a parallel direction to said direction is equal to or greater than a threshold set based on said applying time detected, applying said drive signal set to said moving device.

According to the present invention, when a value of the error signal is equal to or greater than a threshold, in the case where a drive signal is applied, a solid difference individually included in the carriage servo control apparatus is compensated, and carriage servo control can be stably executed based on the drive signal of a proper value.

In order to solve the foregoing problems, according to an eighth aspect of the present invention, there is provided a carriage servo apparatus, wherein the setting device sets the error signal having the value equal to or greater than the threshold as the drive signal, and wherein the applying device applies the error signal set as the drive signal to the moving device.

According to the present invention, an error signal itself having a value equal to or greater than a threshold is applied as the drive signal, and thus, an arrangement of a carriage servo control apparatus can be simplified.

In order to solve the foregoing problems, according to a ninth aspect of the present invention, there is provided an information reproduction apparatus comprising: a carriage servo apparatus according to any one of the first to eighth aspects employed for reproduction of said information recorded on the information recording face; said pickup device; said carriage device; and a reproduction device for reproducing said recorded information based on a detection signal from said pickup device, said detection signal corresponding to the information.

According to the present invention, information can be precisely reproduced while the proper carriage servo control is executed.

In order to solve the foregoing problems, according to a tenth aspect of the present invention, there is provided a carriage servo control method comprising a process for moving a carriage device for supporting a pickup device for recording or reproducing information relevant to an information recording face in a direction parallel to said information recording face by applying a drive signal to a moving device, wherein said carriage servo control method comprising: a process of detecting a minimum value of said drive signal required for moving said carriage device from a still state thereof; and a process of setting said drive signal based on said minimum value detected when said information is recorded or reproduced.

According to the present invention, the minimum value of the required drive signal is actually detected, and the drive signal obtained when recording or reproducing the information is set. Thus, a solid difference individually included in the carriage servo control is compensated, and carriage servo control can be stably executed based on a drive signal of a proper value.

Therefore, in recording or reproducing information relevant to the information recording face, even in the case where a solid difference is included in the carriage servo control apparatus, the carriage servo control is stabilized, and the recording and reproduction can be precisely executed.

In order to the foregoing problems, according to an eleventh aspect of the present invention, there is provided a carriage servo control method according to the tenth aspect, wherein recording or reproducing said information is executed by emitting light beams to an information track on said information recording face, said carriage servo control method further comprising a process of in recording or reproducing the information, when a value of an error signal indicating displacement of an emission position of said light beams relative to said information track on said information recording face in a parallel direction to said direction is equal to or greater than a threshold set based on said minimum value, applying said drive signal set to said moving device.

According to the present invention, when the value of the error signal is equal to or greater than a threshold, in the case where the drive signal is applied, a solid difference individually included in the carriage servo control apparatus is compensated for, and carriage servo control can be stably executed based on the drive signal of a proper value.

In order to solve the foregoing problems, according to a twelfth aspect of the present invention, there is provided a carriage servo control method according to the tenth or eleventh aspect, wherein said process of detecting the minimum value of the drive signal comprises: a process of, while changing a value of said drive signal in a state in which the carriage device is still, applying the drive signal to said moving device, in order to obtain said minimum value, and wherein, when the start of movement of said carriage device due to the applying of said drive signal is detected, a value of the drive signal applied is detected as said minimum value.

According to the present invention, the value of the drive signal obtained when the carriage device starts movement from its still state is defined as a minimum value, and the drive signal obtained when actually recording or reproducing information is set. Thus, a proper minimum value can be set with a simple arrangement.

In order to solve the foregoing problems, according to a thirteenth aspect of the present invention, there is provided a carriage servo control method according to the tenth or eleventh aspect, wherein said process of detecting the minimum value of said drive signal comprises: a process of sensing vibration of the light focusing device supported in said pickup device, said light focusing device focusing said light beams on said information recording face; and a process of, while changing the value of said drive signal in a state in which the carriage device is still, applying the drive signal to said moving device, and wherein, when vibration of said light focusing device along with movement of said carriage device due to the applying of said drive signal is sensed, a value of the drive signal applied is detected as said minimum value.

According to the present invention, the value of the drive signal obtained when it is sensed that the carriage device starts movement from its still state according to whether or not the light focusing device vibrates is defined as the minimum value, and the drive signal obtained when actually recording or reproducing information is set. Thus, a proper minimum value can be set with a simple arrangement.

In order to solve the foregoing problems, according to a fourteenth aspect of the present invention, there is provided a carriage servo control method, wherein said pickup device comprises a light receiving device for receiving reflection light of said light beams from said information recording face, and wherein said process of sensing vibration of the light focusing device senses vibration of said light focusing device due to change in emission position on said light receiving device for said reflection light.

According to the present invention, vibration of the light focusing device can be sensed without adding a new member.

In order to solve the foregoing problems, according to a fifteenth aspect of the present invention, there is provided a carriage servo control method comprising a process for moving a carriage device for supporting a pickup device for recording or reproducing information relevant to an information recording face in a direction parallel to said information recording face by applying a drive signal to a moving device, wherein said carriage servo control method comprising: a process of detecting an applying time relevant to said moving device for said drive signal; and a process of setting said drive signal based on said detected applying time.

According to the present invention, the applying time of the drive signal is actually detected, and the drive signal is set based on the detection. Thus, a solid difference individually included in the carriage servo control apparatus is compensated, and carriage servo control can be stably executed based on the drive signal of a proper value.

Therefore, in recording or reproducing information relevant to the information recording face, even in the case where a solid difference is included in the carriage servo control apparatus, the carriage servo control is stabilized, and the recording or reproduction can be precisely executed.

In order to solve the foregoing problems, according to a sixteenth aspect of the present invention, there is provided a carriage servo control method according to the fifteenth aspect, wherein recording or reproducing said information is executed by emitting light beams to said information recording face, said servo control device further comprising an applying device for, in recording or reproducing the information, when a value of an error signal indicating displacement between an emission position of said light beams and a position of an information track on said information recording face in a parallel direction to said direction is equal to or greater than a threshold set based on said applying time detected, applying said drive signal set to said moving device.

According to the present invention, when the value of the error signal is equal to or greater than a threshold, in the case where the drive signal is applied, a solid difference individually included in the carriage servo control apparatus is compensated for, and carriage servo control can be stably executed based on the drive signal of a proper value.

In order to solve the foregoing problems, according to a seventeenth aspect of the present invention, there is provided a carriage servo control method, wherein said process of setting the drive signal sets said error signal having a value equal to or greater than said threshold as said drive signal, and said process of applying the set drive signal to said moving device applies said error signal set as the drive signal to said moving device.

According to the present invention, an error signal itself having the value equal to or greater than the threshold is applied as the drive signal, an arrangement of carriage servo control can be simplified.

DETAILED DESCRIPTION OF THE PREFERRED EMBODIMENTS

Now, preferred embodiments of the present invention will be described with reference to the accompanying drawings. Each of the embodiments described below is directed to an information reproduction apparatus for reproducing information recorded in an optical disc such as CD or DVD, wherein the present invention is applied to an information reproduction apparatus for performing carriage servo control in a mode in which a tracking error signal Ste having a value greater than a threshold $V_Z$ described above, of a tracking error signal Ste described later, is defined as a carriage control signal Scc, and is applied to a carriage motor 8.

(I) First Embodiment

Figure 1:
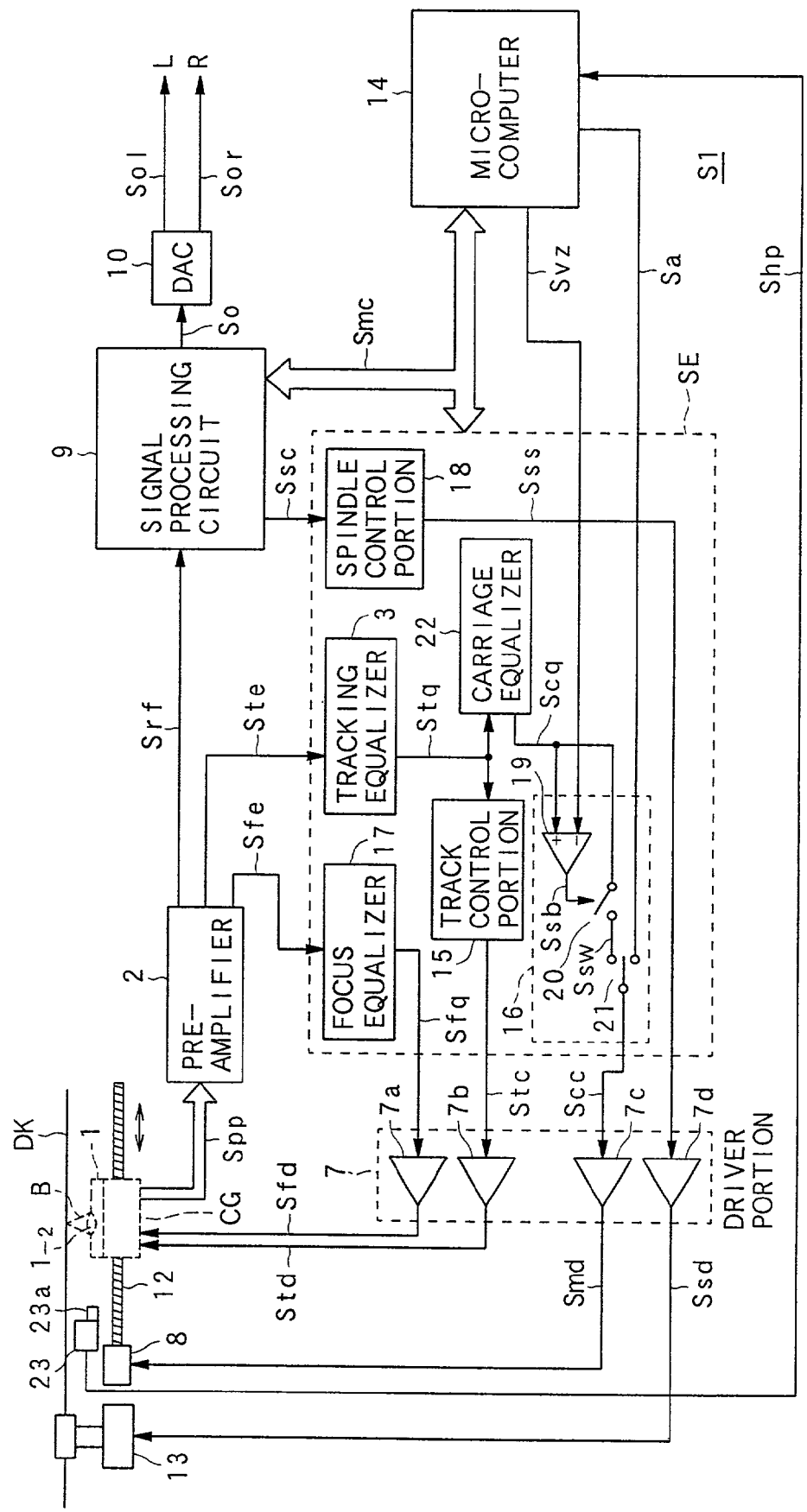
FIG. 1 is a block diagram showing a general configuration of an information reproduction apparatus according to the first embodiment of the present invention.
Figure 2:
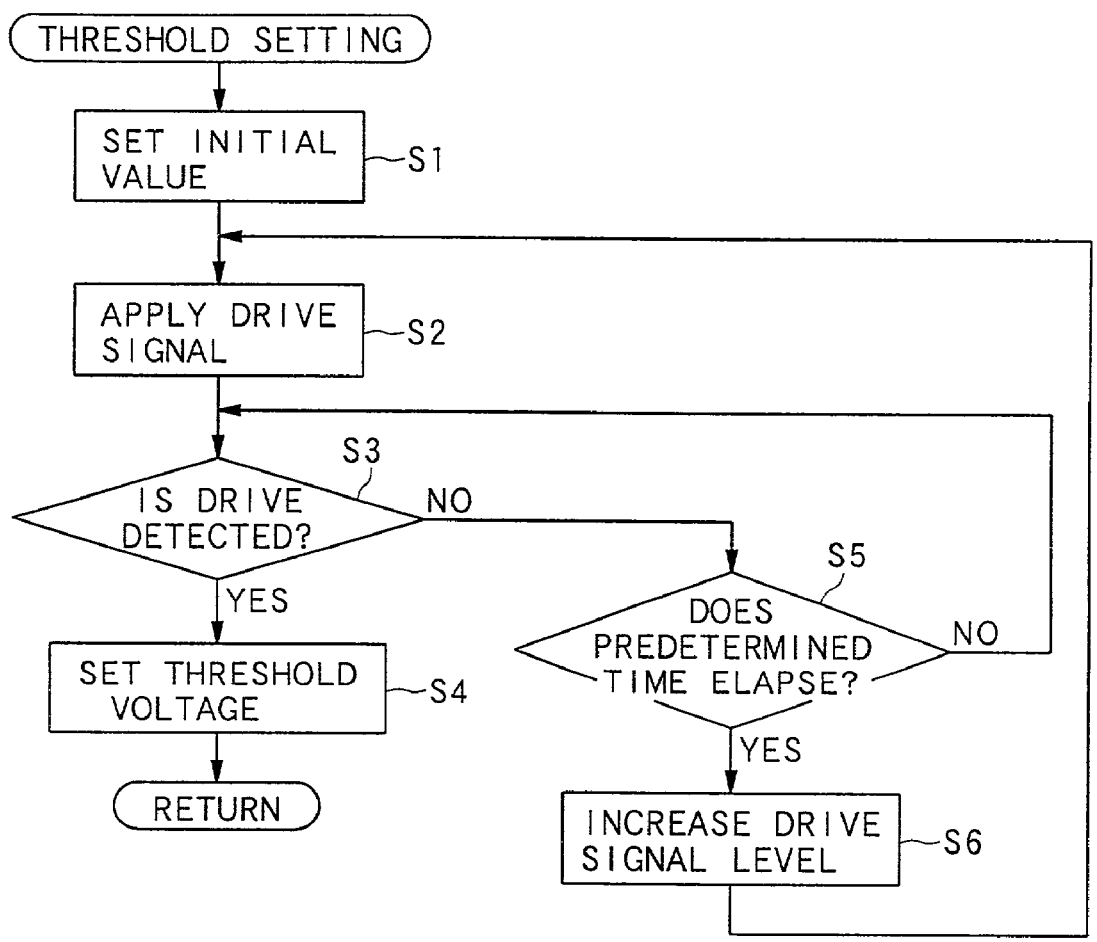
FIG. 2 is a flow chart showing a threshold setting process according to the first embodiment.
Figure 3:
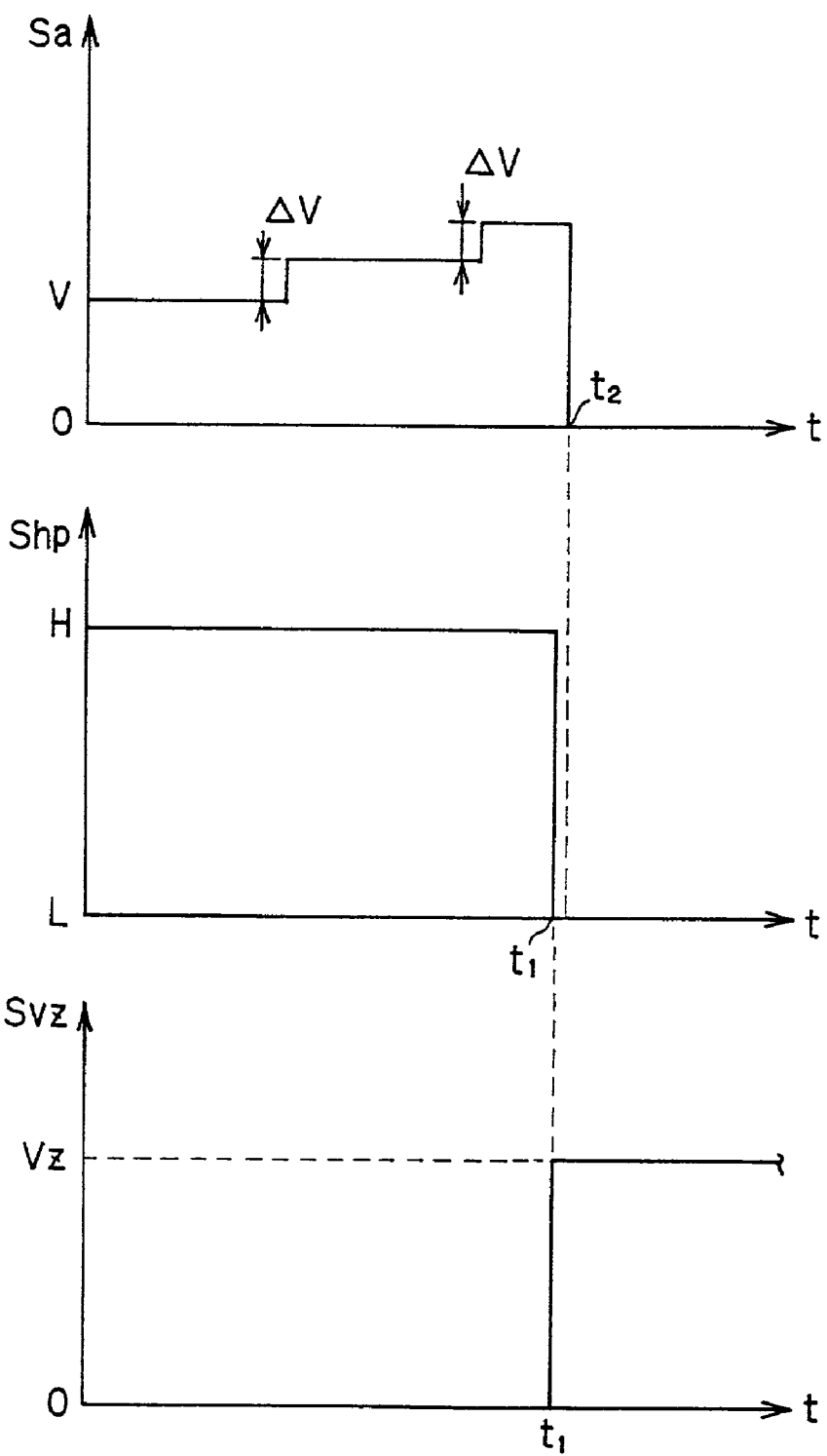
FIG. 3 is a timing chart showing the threshold setting process according to the first embodiment.

Now, the first embodiment according to the present invention will be described with reference to FIG. 1 to FIG. 3. FIG. 1 is a block diagram showing a general configuration of an information reproduction apparatus according to the first embodiment. FIG. 2 is a flow chart showing a threshold setting processing according to the first embodiment. FIG. 3 is a timing chart showing the threshold setting process.

As shown in FIG. 1, the information reproduction apparatus S1 according to the first embodiment is composed of: a pickup 1 containing an objective lens $1_{-2}$ that is a light focusing device for focusing an information reproduction light beam B on an information recording face in an optical disc DK, the pickup 1 being a pickup device supported by a carriage CG that is a carriage device to move in a radial direction of the optical disc DK; a preamplifier 2; a driver portion 7 containing amplifiers 7a to 7d; a carriage motor 8 consisting of a DC motor that is a moving device; a signal processing circuit 9 that is a reproduction device; a D/A (Digital/Analog) converter 10; a shaft 12; a spindle motor 13; a microcomputer 14 that is a drive signal determining device, a setting device, a threshold calculating device, a sensing device, and a time detecting device; a carriage home position sensing portion 23 that is a stillness detecting device including a push-button switch 23a; and a servo equalizer portion SE.

In addition, the servo equalizer SE is composed of: a tracking equalizer 3; a track control portion 15; a carriage control portion 16 that is an applying device according to the present invention; a focus equalizer 17; a spindle control portion 18; and a carriage equalizer 22.

Further, the carriage control portion 16 is composed of a comparator 19 and switches 20 and 21.

Now, a general operation will be described below.

First, the pickup 1 emits the above light beam B to the information recording face in the optical disc DK that rotates at a rotation frequency preset by the spindle motor 13 driven by a spindle drive signal Ssd described later. Then, the pickup 1 generates a detection signal Spp that corresponds to the information to be reproduced based on the reflection light, and outputs the signal to the preamplifier 2.

At this time, adjustment of a light focusing position in a direction vertical to the information recording face of the light beam B is performed by the objective lens $1_{-2}$ moving in the vertical direction by means of a focusing actuator (not shown) to which a focus drive signal Sfd described later is applied. In this manner, the light focusing position is precisely coincident with a position in the vertical direction of the information recording face.

On the other hand, adjustment of a light focusing position in the radial direction of the optical disc DK parallel to the information recording face of the light beam B (hereinafter, simply referred to as radial direction) is performed by the objective lens $1_{-2}$ moving in the radial direction by a tracking actuator (not shown) to which the tracking drive signal Std described later is applied. In this manner, the light focusing position is precisely coincident with a position of an information track on the information recording face in the radial direction.

Further, in the case where the servo control in the radial direction is required in excess of the movable limit in the radial direction of the objective lens $1_{-2}$ along with rotation of the optical disc DK, the carriage motor 8 rotates based on a motor drive signal Smd described later. Along with the resultant rotation of the shaft 12, the carriage CG supporting the pickup 1 moves in the radial direction, whereby the servo control is executed.

Next, the preamplifier 2 to which a detection signal Spp is inputted generates, based on the detection signal Spp, a so called focus error signal Sfe indicating displacement between the light focusing position of the light beam B and the position of the above information recording face in a direction vertical to the information recording face; a so called tracking error signal Ste indicating displacement in the radial direction between the light focusing position and the position of the information recording face; and a reproduction signal Srf that corresponds to information recorded in the optical disc DK, respectively, in accordance with the conventional measures. Then, the preamplifier 2 outputs these signals to a focus equalizer 17, a tracking equalizer 3 and a signal processing circuit 9, respectively.

In this manner, the signal processing circuit 9 generates a rotation control signal Ssc employed for rotation control of the spindle motor 13 and outputs the signal to the spindle control portion 18 based on a reproduction signal Srf while receiving control information Smc required for communication with the microcomputer 14. In addition, the circuit generates an output signal $S_O$ that corresponds to information recorded in the optical disc DK, and outputs the signal to the D/A converter 10.

Th D/A converter 10 converts the output signal $S_O$ into an analog signal, divides the signal into a left output signal Sol for left output and a right output signal Sor for right output, and outputs these signals to a left speaker (not shown) for left output and a right speaker (not shown) for right output, respectively.

In parallel to this, the focus equalizer 17 in a servo equalizer portion SE applies processing such as waveform trimming to the focus error signal Sfe, and generates a focus control signal Sfq for diving the focus actuator and outputs the signal to the amplifier 7a.

In this manner, the amplifier 7a amplifies the focus control signal Sfq, outputs it as the focus drive signal Sfd to the focus actuator, controlling its rotation.

On the other hand, the spindle control portion 18 in the servo equalizer portion SE generates a spindle control signal Sss for rotationally controlling the spindle motor 13 based on the rotation control signal Ssc, and outputs the signal to the amplifier 7d.

In this manner, the amplifier 7d amplifies the spindle control signal Sss, outputs it as the spindle drive signal Ssd to the spindle motor 13, controlling its rotation.

Figure 10A:
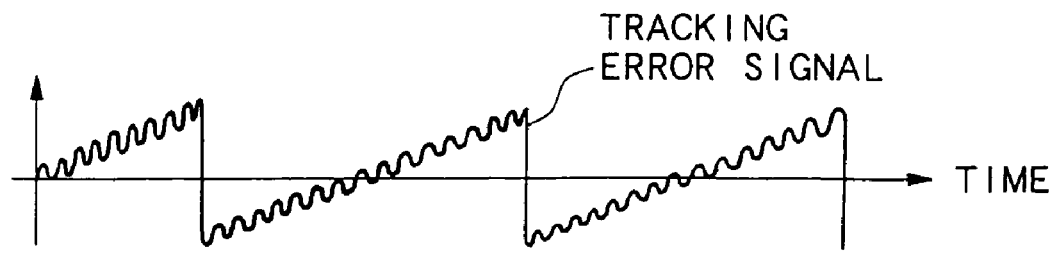
FIG. 10($a$) and FIG. 10($b$) are diagrams showing general carriage servo control, wherein FIG. 10($a$) is a waveform diagram showing a general waveform of a tracking error signal, and FIG. 10($b$) is a waveform diagram showing a general waveform of a drive signal for carriage servo control.

Next, the tracking equalizer 3 in the servo equalizer portion SE applies processing such as waveform trimming to the tracking error signal Ste. The equalizer generates a control signal Stq for driving the tracking actuator and carriage motor 8 (specifically, having a waveform similar to the tracking error signal shown in FIG. 10(a)), and outputs the signal to the track control portion 15 and the carriage equalizer 22.

In this manner, the track control portion 15 generates a tracking control signal Stc for controlling the tracking actuator to be driven based on the control signal Stq, and outputs the signal to the amplifier 7b.

Then, the amplifier 7b amplifies the tracking control signal Stc, outputs it as the tracking drive signal Std to the tracking actuator, controlling its drive.

Figure 10B:
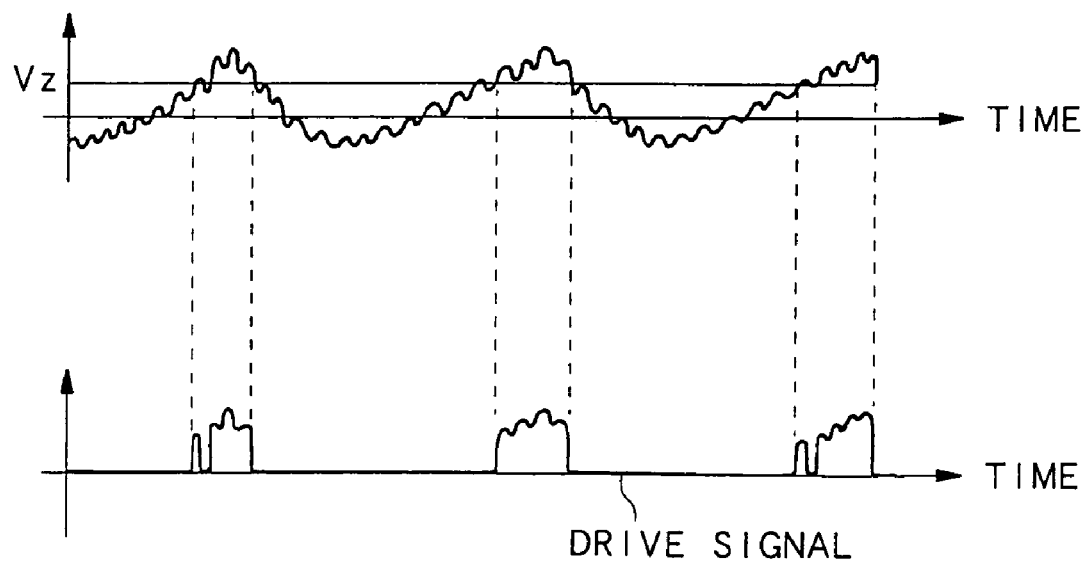

On the other hand, the carriage equalizer 22 generates a carriage signal Scq for driving the carriage motor 8 based on a control signal Stq (specifically, having a waveform similar to the signal shown at the upper part of FIG. 10(b)), and outputs the signal to one input terminal of the comparator 19 in the carriage control portion 16 and a switch 20, respectively.

In this manner, the comparator 19 compares a threshold $V_z$ included in a threshold signal Svz described later with the above carriage signal Scq. Only when the value of the carriage signal Scq is larger than the threshold $V_z$, a switch control signal Ssb for turning ON a switch 20 is generated, and is outputted to the switch 20.

Then, the switch 20 outputs the carriage signal Scq as a switch signal Ssw intact to one input terminal of a switch 21 only when the value of the carriage signal Scq is larger than the threshold $V_Z$ based on the switch control signal Ssb.

Then, the switch 21 for switching a drive signal Sa described later and a switch signal Ssw is always set to the switch signal Ssw after starting reproduction of information from the optical disc DK. The switch signal Ssw is outputted intact as a carriage control signal (specifically, having a waveform similar to a drive signal shown at the lower part of FIG. 10(b)) to the amplifier 7c.

In this manner, the amplifier 7c amplifies the carriage control signal Scc, outputs it as the motor drive signal Smd to the carriage motor 8, controlling its rotation.

By the above operations, as in the conventional manner, only when the value of the carriage signal Scq is larger than the threshold $V_Z$, the carriage motor 8 is rotationally driven by a motor drive signal Smd, and the carriage CG moves the pickup 1 in the radial direction.

In parallel to these operations, the microcomputer 14 integrally controls operation of the signal processing circuit 9 and servo equalizer portion SE while receiving the control information Smc between the signal processing circuit 9 and the servo equalizer portion SE.

Further, upon the start of information reproduction, the microcomputer 14 performs change and set processing of the threshold $V_Z$ according to the present invention while outputting a drive signal Sa described later to the other input terminal of the switch 21, based on a sensing signal Shp from the carriage home position sensing portion 23 for sensing the fact that the carriage CG exists at the position of the innermost circumference portion of the optical disc.

At this time, the push-button switch 23a in the carriage home position sensing portion 23 is pressed when the pickup 1 is at the position of the innermost circumference portion. In addition, this switch is released when the pickup 1 starts movement in the outer circumference direction along with rotation of the shaft 12 due to the above carriage servo control.

Then, by operation of this push-button switch 23a, when the pickup 1 starts to move, the carriage home position sensing portion 23 generates the sensing signal Shp for changing from "HIGH" to "LOW", and outputs the signal to the microcomputer 14.

Now, the change and set processing of the threshold $V_Z$ according to the present embodiment will be described with reference to FIG. 2 and FIG. 3.

First, the change and set processing of the threshold $V_Z$ is mainly executed by the microcomputer 14 before starting information reproduction from the optical disc DK. At this time, the switch 21 is set to the drive signal Sa side described later.

In this state, in the change and set processing executed by the microcomputer 14, as shown in FIG. 2, the threshold $V_Z$ is first preset to an initial value V0 (common to a plurality of information processing apparatus S1) (step S1).

Then, a drive signal Sa having a preset level V from the microcomputer 14 (refer to the top stage of FIG. 3) is defined as a motor drive signal Smd, and is applied to the carriage motor 8 via the switch 21 and amplifier 7c (step S2).

Then, by applying the motor drive signal Smd having the level V, it is judged whether or not the start of movement in the radial direction of the pickup 1 (carriage CG) is sensed at the carriage home position sensing portion 23 based on the sensing signal Shp (step S3).

At this time, in the case where the movement in the radial direction of the pickup 1 cannot be started by a motor drive signal Smd having the level V for a reason such as stiffness of a gear (not shown) provided between the shaft 12 and the carriage CG, for example, the sensing signal Shp is not changed while a state "HIGH" is maintained. In this manner, the microcomputer 14 recognizes that the pickup 1 does not still start to move.

In this manner, in the judgment of the step S3, when the start of movement of the pickup 1 (that is, movement of the carriage CG) is not sensed (step S3: NO), it is further judged whether or not a time for judgment of the preset step S3 has elapsed or not (step S5). When the time has not elapsed (step S5: NO), it is impossible to determine that the pickup 1 does not start to move yet. Then, processing goes to the step S3 at which such judgment is repeated. On the other hand, when the judgment time has elapsed (step 5: YES), it is determined that the pickup 1 does not start to move yet. Then, the level of the drive signal Sa is increased by a preset increment $\Delta V$ (step S6 at which processing of V←V+$\Delta V$ is performed). Then, the motor drive signal Smd that corresponds to the incremented drive signal Sa is applied again, whereby processing goes to the step S2 at which processing of the steps S3, S5 and S6 is repeated in order to detect a drive state of the carriage motor 8 (refer to the top stage of FIG. 3).

On the other hand, in the judgment of the step S3, the fact that the carriage motor 8 is started to be driven due to an increased level of the drive signal Sa (motor drive signal Smd), and the pickup 1 starts to move, is sensed through change in the signal Shp from "HIGH" to "LOW" (step S3: YES. Refer to a time $T_1$ at the upper second stage of FIG. 3), the level of the drive signal Sa at that time (this level is a minimum value of the drive signal Sa (in other words, mode drive signal Smd) required for moving the pickup 1) is defined as a reference; the threshold $V_Z$ during information reproduction from the optical disc DK is set (step S4. Refer to the time $t_1$ at the lowest level of FIG. 3); the set threshold $V_Z$ is stored in a memory (not shown) in the microcomputer 14; change and set processing of the threshold $V_Z$ is terminated; the switch 21 is set to the switch signal Ssw side; and a series of the above described information reproduction processes are started by employing the threshold signal Svz indicating the set threshold $V_Z$.

At this time, in the processing of the step S4, there is anticipated that the level of the motor drive signal Smd obtained when the pickup 1 starts to move changes during the information reproduction due to a mechanical change caused by a temperature change during actual information reproduction. As a result, when the level of the motor drive signal Smd obtained when the pickup 1 starts to move is V', the threshold $V_Z$ is set by adding a margin to the level value V' taking into consideration the above change (more specifically, for example, so as to be 1.2 times of the level V').

In addition, after the threshold $V_Z$ has been newly set, the drive signal Sa is initialized to a zero level at a time $t_2$ (slightly slower than the above time $t_1$) shown at the top stage of FIG. 3, for example.

As described above, the threshold setting process caused by the microcomputer 14 according to the first embodiment, is characterized in that the threshold $V_Z$ for generating the motor drive signal Smd when reproducing information is made variable based on the minimum value of the drive signal Sa (motor drive signal Smd) required for moving the carriage CG from its still state. Thus, a solid difference on carriage control individually included in the information reproduction apparatus S1 is compensated irrespective of whether or not the optical disc DK is present, and the motor drive signal Smd of a proper value is set, whereby carriage servo control can be executed.

In addition, the above threshold $V_Z$ is set based on the value of the drive signal Sa obtained when the carriage CG starts to move from its still state. Thus, a proper $V_Z$ (1.2 times of the level V' in the case of the first embodiment) can be set with a simple arrangement. In addition, information can be reproduced from the optical disc DK while proper carriage servo control is executed.

Further, in order to sense the movement of the carriage 8, there is used the carriage home position sensing portion 23 that may be any component conventionally used to sense whether or not the carriage is at the position of the innermost circumference portion of the optical disc. Thus, the information reproduction apparatus S1 can be provided without making any major change to the conventional information reproduction apparatus.

(II) Second Embodiment

Now, the second embodiment that is another embodiment according to the present invention will be described with reference to FIG. 4 to FIG. 6.

Figure 4:
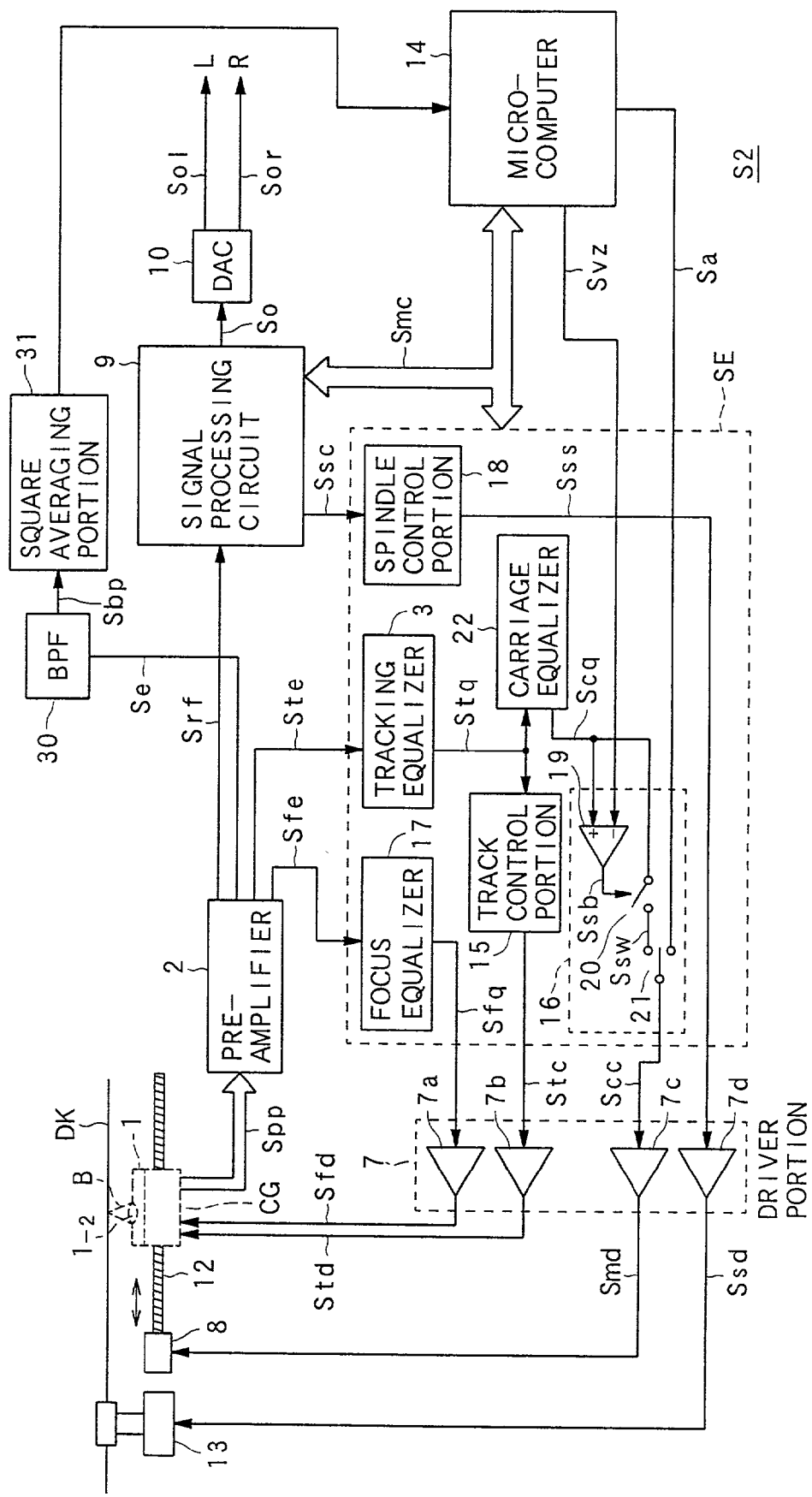
FIG. 4 is a block diagram showing a general configuration of an information reproduction apparatus according to the second embodiment of the present invention.

FIG. 4 is a block diagram showing a general configuration of an information reproduction apparatus according to the second embodiment. FIG. 5 and FIG. 6 are diagrams each showing a threshold setting process according to the second embodiment.

In the threshold setting process according to the above first embodiment, the start of movement of the pickup 1 due to the drive signal Sa during the setting process is recognized in the microcomputer 14 based on the contents of the sensing signal Shp from the carriage home position sensing portion 23 (refer to step S3 of FIG. 2). In the threshold setting process according to the second embodiment, immediately after the pickup 1 has started to move, it is detected whether or not an objective lens $1_{-2}$ vibrates due to inertia by using the fact that the objective lens $1_{-2}$ vibrates in the radial direction due to inertia at a specific vibration frequency of an actuator coil (not shown) in the above tracking actuator, thereby sensing the start of movement of the pickup 1.

In addition, in FIG. 4, like elements shown in FIG. 1 are designated with the same reference numerals. A detailed description thereof is omitted.

Further, with respect to the threshold setting process according to the second embodiment, the entire processing is totally identical to that according to the first embodiment of which the flow chart is shown in FIG. 2, except that the step S3 for sensing movement of the pickup 1 in FIG. 2 is different from another one. A description of the entire processing is omitted.

As shown in FIG. 4, instead of the carriage home position sensing portion 23 in the information reproduction apparatus S1 according to the first embodiment shown in FIG. 1, an information reproduction apparatus S2 according to the second embodiment comprises: a band pass filter 30 for extracting a signal in a frequency bandwidth that corresponds to a specific vibration frequency of the actuator coil from an error signal Se described later outputted from the preamplifier 2, and then, outputting the signal as an extraction signal Sbp to a square averaging portion 21; and the square averaging portion 31 for generating a lens error signal Sle indicating whether or not the objective lens $1_{-2}$ vibrates due to inertia at a specific vibration frequency of the actuator coil, and then, outputting the signal to the microcomputer 14.

In the information reproduction apparatus S2, the arrangement and operation other than elimination of the carriage home position sensing portion 23 and addition of the band pass filter 30 and square averaging portion 31 are totally identical to those of the information reproduction S1 according to the first embodiment. A detailed description thereof is omitted.

Now, the above error signal Se outputted from the preamplifier 2 and the corresponding lens error signal Sle will be described with reference to FIG. 5 and FIG. 6.

Figure 5:
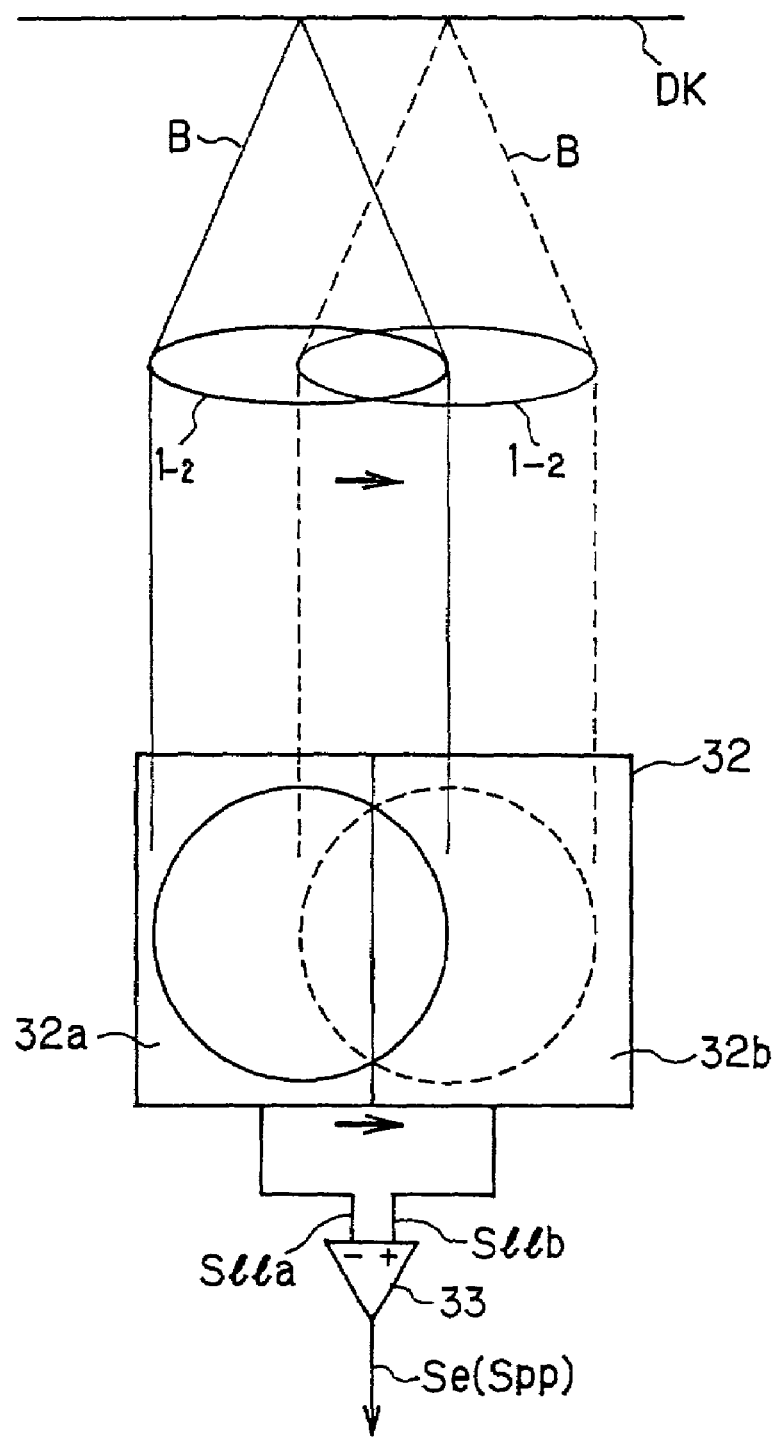
FIG. 5 is a diagram showing the threshold setting process according to the second embodiment.
Figure 6:
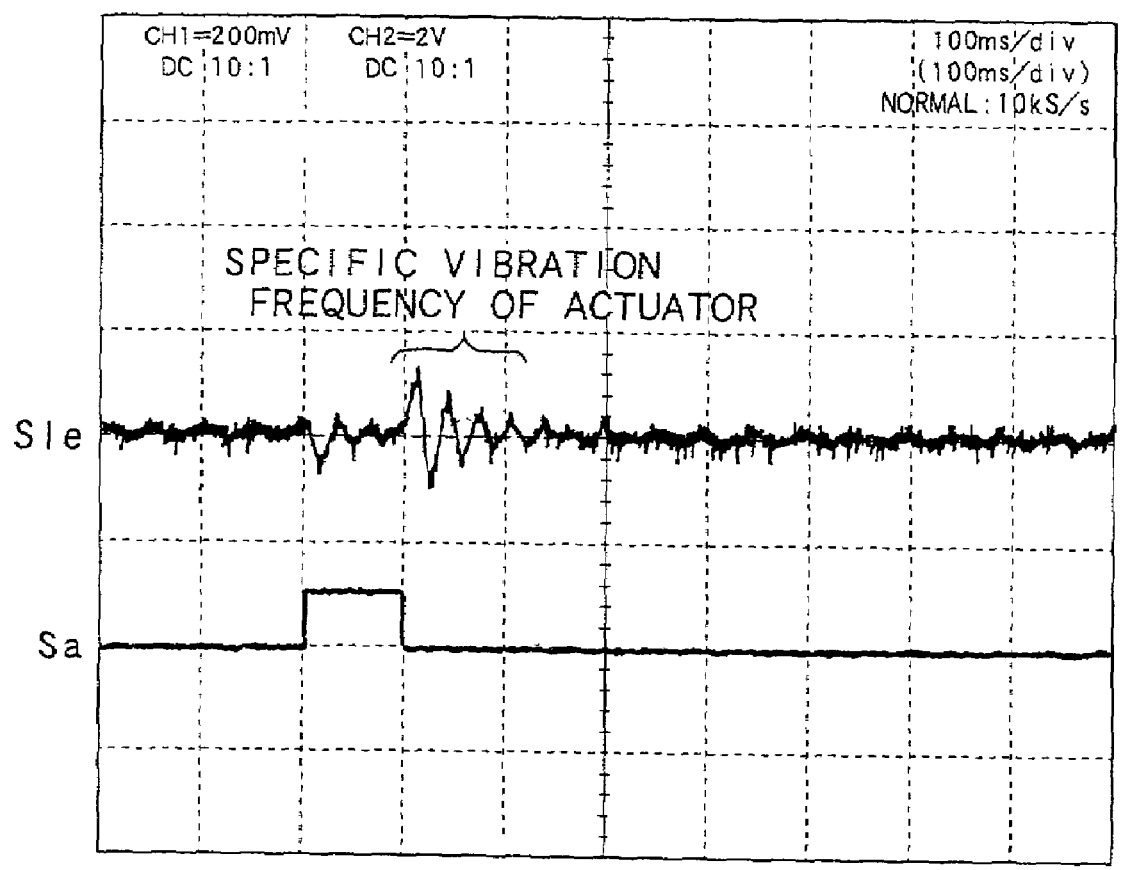
FIG. 6 is a waveform diagram showing the threshold setting process according to the second embodiment.

First, when a threshold setting process is executed before starting information reproduction, in generating the error signal Se, as shown in FIG. 5, reflection light from the optical disc DK of the light beam B is received by a light receiving portion 32 that is light receiving device in the pickup 1, the light receiving device being divided into a partial light receiving portion 32a and a partial light receiving portion 32b by a dividing line vertical to the radial direction.

At this time, immediately after the pickup 1 has started to move due to the applying of a drive signal Sa having a level equal to or greater than a movement start enable level, the objective lens $1_{-2}$ moves due to its inertia in a direction indicated by the arrow shown in FIG. 5, thereby starting vibration due to the specific vibration frequency of the actuator coil.

When vibration of this objective lens $1_{-2}$ is started, the emission range of reflection light at the light receiving portion 32 moves reciprocally between the partial light receiving portions 32a and 32b along with the vibration, as shown in FIG. 5.

In the second embodiment, a difference between a light receiving signal S11a from the partial light receiving portion 32a and a light receiving signal S11b is taken by means of an differential amplifier 33 included in the pickup 1. The difference is outputted as the error signal Se to the band pass filter 30 via the above preamplifier 2.

At this time, the lens error signal Sle generated based on the error signal Se generated as described above changes in an attenuation manner at a predetermined cycle (at a predetermined cycle that corresponding to the specific vibration frequency of the above actuator coil) according to a timing when the drive signal Sa is applied.

At the step S3 in FIG. 2 executed in the microcomputer 14, a timing at which the vibration of this predetermined cycle is included in the lens error signal Sle is defined as a timing when the pickup 1 starts to move. Then, as in the case with the first embodiment, the level of the drive signal Sa at that time is defined as a reference, and a threshold $V_Z$ during information reproduction from the optical disc DK is set (step S4 in FIG. 2). Then, the set threshold $V_Z$ is stored in a memory (not shown) in the microcomputer 14, and the change and set processing of the threshold $V_Z$ is terminated. Then, the switch 21 is set to the switch Ssw side, and a series of information reproduction processes are started.

In the threshold setting process of the threshold $V_Z$ caused by the microcomputer 14 according to the second embodiment, unlike the case of the first embodiment, in order to acquire an error signal Se, it is required that the optical disc DK is mounted, and further, the focus servo control for the optical disc DK is executed.

As has been described above, in the threshold setting process of the threshold $V_Z$ caused by the microcomputer 14 according to the second embodiment, as in the case with the first embodiment, when information is reproduced, the threshold $V_Z$ for generating the motor drive signal Smd is made variable based on the maximum value of the drive signal Sa required for moving the carriage CG from its still state. Thus, a solid difference on carriage servo control individually included in the information reproduction apparatus S2 is compensated, and carriage servo control can be executed based on the motor drive signal Smd of a proper value.

In addition, the threshold $V_Z$ is set based on the value of the drive signal Sa when it is sensed that the carriage CG starts to move from its still state according to whether or not the objective lens $1_{-2}$ vibrates. Thus, the value $V_Z$ can properly be set with a simple arrangement, without adding a new member.

Further, the error signal Se is generated by using the light receiving portion 32 for general information reproduction intact. Thus, the information reproduction apparatus S2 can be achieved without making major change for the conventional information reproduction apparatus.

(III) Third Embodiment

Now, a third embodiment that is another embodiment according to the present invention will be described with reference to FIG. 7 to FIG. 9.

Figure 7:
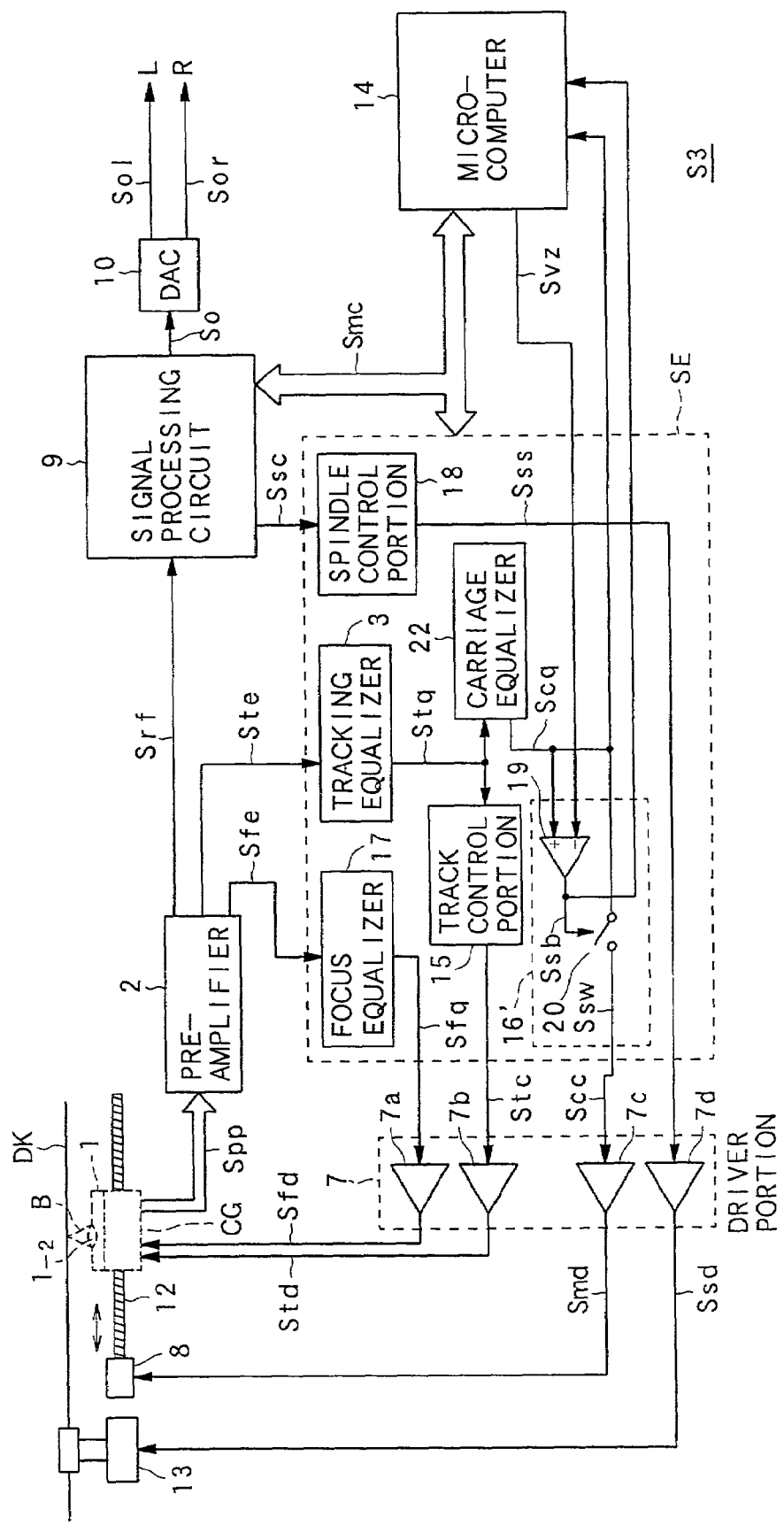
FIG. 7 is a block diagram showing a general configuration of an information reproduction apparatus according to the third embodiment of the present invention.

FIG. 7 is a block diagram showing a general configuration of an information reproduction apparatus according to the third embodiment. FIG. 8 is a flow chart showing a threshold setting process according to the third embodiment. FIG. 9 is a timing chart showing the threshold setting process according to the third embodiment.

In the above threshold setting process according to the first or second embodiment, an arrangement is provided to recognize the start of movement of the pickup 1 caused by the applying of the drive signal Sa during the setting process, to define the level of the drive signal Sa at that timing as the minimum value (that is, the required minimum value of the motor dive signal Smd) such that the pickup 1 is movable, and to newly set a threshold $V_Z$ based on this minimum value. However, in the threshold setting process according to the third embodiment, the value of the threshold $V_Z$ itself is directly changed during information reproduction processing from the disc DK.

Figure 8:
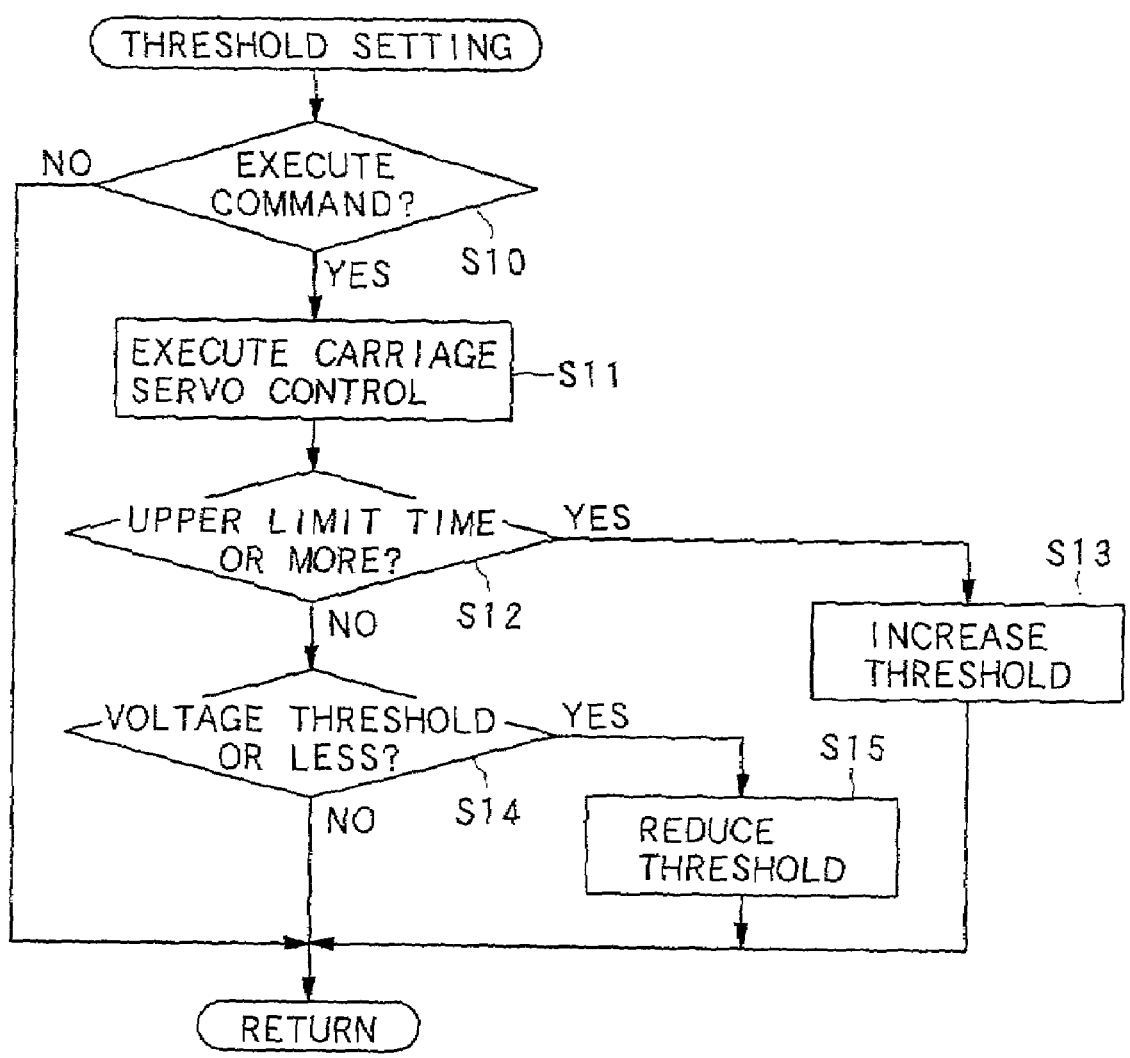
FIG. 8 is a flow chart showing a threshold setting process according to the third embodiment.
Figure 9:
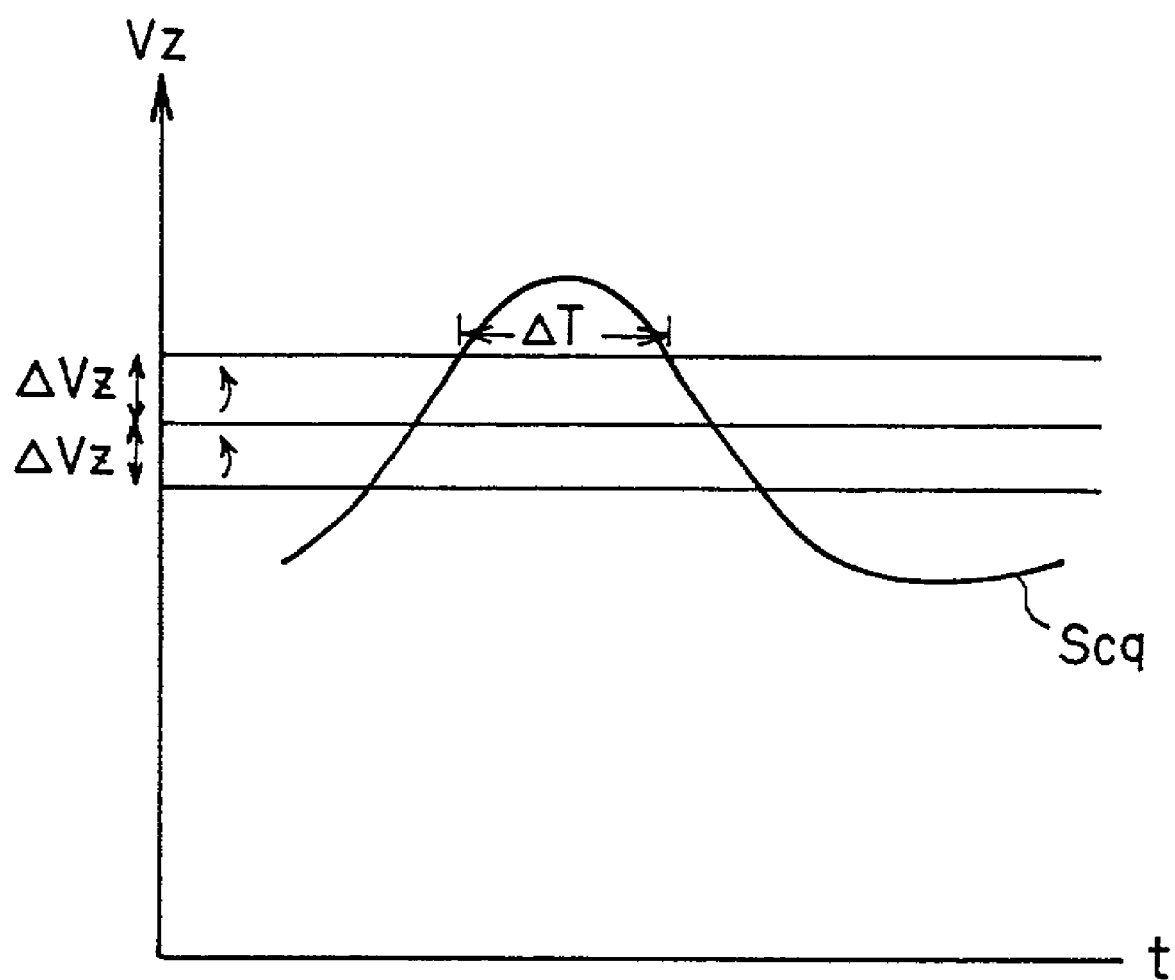
FIG. 9 is a timing chart showing the threshold setting process according to the third embodiment.

In FIG. 7 or FIG. 8, like elements shown in FIG. 1 or like elements or processes shown in FIG. 2 are designated by the same reference numerals or step numbers. A detailed description is omitted here.

As shown in FIG. 7, an information reproduction apparatus S3 according to the third embodiment does not use the carriage home position sensing portion 23 in the information reproduction apparatus S1 according to the first embodiment shown in FIG. 1 for the threshold setting process according to the third embodiment. Further, a switch 21 is eliminated from the information reproduction apparatus S1, and a comparator 19 and a switch 20 as in the case of the first embodiment are provided instead of the carriage control portion 16 in the information reproduction apparatus S1. Furthermore, a switch control signal Ssb from the comparator 19 and a carriage signal Scq from a carriage equalizer 22 are outputted to the microcomputer 14 as well as the switch 20 or the comparator 19. Still further, there is provided a carriage control portion 16' arranged to output a switch signal Ssw to the amplifier 7c intact. Then, the amplifier 7c applies amplification processing to the switch signal Ssw as in the case of the first embodiment, and outputs it as a motor drive signal Smd to the carriage motor 8.

In the information reproduction apparatus S3, an arrangement and an operation other than non-use of the carriage home position sensing portion 23 and provision of the carriage controller portion 16' are totally identical to the information reproduction apparatus S1 according to the first embodiment. A detailed description thereof is omitted.

Now, change and set processing of the threshold $V_Z$ according to the third embodiment will be described with reference to FIG. 8 and FIG. 9.

In the change and set processing executed by the microcomputer 14, as shown in FIG. 8, it is first judged whether or not a command for resetting the threshold $V_Z$ is issued during information reproduction processing from the optical disc DK (step S10). When the command is not issued (step S10: NO), it goes to general information reproduction processing. On the other hand, when the command is issued (step S10: YES), the usual carriage servo control is then executed in the information reproduction processing (step S1).

Then, in the carriage servo control, a time ΔT when the value of the carriage signal Scq is larger than the current threshold $V_Z$ is recognized as a time when a switch control signal Ssb is outputted in the microcomputer 14. Then, it is judged whether or not the time ΔT is equal to or larger than an upper limit time preset as the upper limit of a time when the switch control signal Ssb is outputted (step S12).

When the time ΔT recognized is longer than the upper limit time (step S12: YES), the value of the threshold $V_Z$ is then increased by an increment ΔVz (Refer to the step S13 at which sign ΔVz (upward arrow) is shown in FIG. 9. That is, processing of $V_Z \leftarrow V_Z + \Delta Vz$ is performed). Then, information reproduction processing including the usual carriage servo control is executed by using the incremented new threshold $V_Z$.

On the other hand, in judgment of the step S12, when the time ΔT in which the value of the carriage signal Scq is larger than the threshold $V_Z$ is equal to or smaller than the upper limit time (step S12: NO), the value of the threshold $V_Z$ is judged to be proper in comparison with the upper limit time. Then, it is judged whether or not the value of the carriage signal Scq is equal to or smaller than a negative voltage threshold set relevant to the carriage signal Scq (step S14).

Here, the negative voltage threshold is a voltage threshold preset relevant to the carriage signal Scq in order to judge whether or not the carriage CG has passed through a stop position after the movement of the carriage.

When the value of the carriage Scq is equal to or smaller than the negative voltage threshold (step S14: YES), the value of the threshold $V_Z$ is judged to be excessively high. Thus, it is judged that the carriage CG has passed at the stop position. Then, the value of the threshold $V_Z$ is reduced by a preset decrement ΔVz (Refer to the step S15 at which sign ΔVz (downward arrow) is shown in FIG. 9. That is, processing of $V_Z \leftarrow V_Z - \Delta Vz$ is performed). Then, information reproduction processing including the usual carriage servo control is executed by using the reduced new threshold $V_Z$.

On the other hand, in judgment of the step S14, when the value of the carriage signal Scq is equal to or larger than the negative voltage threshold (step S14: NO), it is judged that the value of the threshold $V_Z$ at that time is proper in comparison with the negative voltage threshold. Then, processing returns to information reproduction processing without making change of the threshold $V_Z$.

It is recognized whether or not the new threshold $V_Z$ set at the step S13 or S15 is proper in a relationship between the above upper limit time and the negative voltage threshold, in judgment at the steps S12 and S14 in a series of processes shown in FIG. 8 to be executed next time.

As has been described above, the threshold setting process of the threshold $V_Z$ caused by the microcomputer 14 according to the third embodiment is characterized in that the optimal threshold $V_Z$ for generating the motor drive signal Smd is set while the threshold $V_Z$ is changed based on a time ΔT when the carriage signal Scq is obtained as a value equal to or larger than the threshold $V_Z$. Thus, a solid difference on carriage servo control individually included in the information reproduction S3 is compensated, and the carriage servo control can be executed based on the motor drive signal Smd of a proper value.

In addition, in information reproduction, the threshold $V_Z$ is set every time the carriage CG is driven. Thus, the threshold $V_Z$ can be optimally set in consideration of a difference in rotation torque of the shaft 12 for movement of the carriage CG caused by a positional difference of the carriage CG on the shaft 12.

In the threshold setting process of the threshold $V_Z$ caused by the microcomputer 14 according to the third embodiment, unlike the case of the first embodiment, the tracking error signal Ste and the focus error signal Sfe are employed. Thus, it is required that the optical disc DK is mounted, and further, the focus servo control and the tracking servo control relevant to the optical disc DK are executed all together.

In addition, in the threshold setting process shown in FIG. 8, the processing at the steps S12 and S13 may be executed after the processing at the steps S14 and S15.

(IV) Modified Embodiment

A modified embodiment according to the present invention will be described below.

The above described embodiments each describe a case in which the present invention is applied to the information reproduction apparatuses S1 to S3 for reproducing information recorded in the optical disc DK. In addition, as in each of the above described embodiments, the present invention can also be applied to the carriage servo control of the light focusing position of light beams when the information is recorded with the use of the information recording apparatus for recording information on an optical disc in which the information supplied from the outside is recordable.

In this case, the information to be recorded is modified at a modification portion while executing each servo control (such as the focus servo control) including the carriage servo control to which the present invention is applied. Further, the information to be recorded is recorded by controlling the strength of recording light beams by means of a record control portion based on the modified information.

In addition, the above described embodiments each describes a case in which the motor drive signal Smd is generated based on the carriage signal Scq having its level equal to or larger than a newly set threshold $V_Z$, thereby implementing the carriage servo control. In addition, the other preset signal, which is equal to or larger than the newly set threshold $V_Z$, may be defined as the motor drive signal Smd to be applied to the carriage motor 8. Further, a threshold signal Svz having a newly set threshold $V_Z$ itself may be defined as the motor drive signal Smd to be applied to the carriage motor 8.

Furthermore, two or more of the threshold setting processes in the above-described embodiments can be combined with each other so as to set a threshold.

In addition, the above-described embodiments each describe a case in which the DC motor is used as the carriage motor 8. Otherwise, the other motor such as so called stepping motor may be used as the carriage motor 8. At this time, in the case where the stepping motor is used as the carriage motor 8, a part of the tracking error signal Ste cannot be used as the drive signal Sa as described above. Thus, another specific drive signal is used.

Further, the first and second embodiments each describe a case in which the minimum value of the drive signal Sa is detected when the carriage CG starts to move from the inner periphery of the optical disc DK to the outer periphery. Otherwise, the carriage 8 moves from the outer periphery of the optical disc DK to the inner periphery; the carriage home position sensing portion 23 is turned ON, and then, moves again toward the outside, whereby the drive signal Sa is applied so as to move the carriage home position sensing portion 23 toward the outside again immediately after the sensing position has been turned OFF. Further, the drive signal Sa is applied, and the fact that the carriage CG starts to move is sensed by the carriage home position sensing portion 23, whereby the drive signal Sa at that time may be set to its minimum value.

Furthermore, the drive signal Sa in the first and second embodiments may be formed in a pulse shaped signal. In this case, the pulse shaped signal rising more steeply can generate a large current value. Thus, there is an advantage that voltage of the drive signal Sa being a startup signal (carriage startup voltage) of the carriage 8 can be reduced.

The entire disclosure of Japanese Patent Application No. 2000-88565 filed on Mar. 24, 2000 including the specification, claims, drawings and summary is incorporated herein by reference in its entirety.

What is claimed is:

1. A carriage servo apparatus comprising a carriage device for supporting a pickup device for recording or reproducing information relevant to an information recording face and a moving device for moving the carriage device in a direction parallel to said information recording face based on a drive signal, said carriage servo apparatus further comprising:
    a drive signal determining device for determining a value of said drive signal at a time when an increase in a level of the drive signal from a predetermined level causes the carriage device to initially move from a still state; and
    a setting device for setting said drive signal based on said determined value when the information is recorded or reproduced.

2. The carriage servo apparatus according to claim 1, wherein recording or reproducing said information is executed by emitting light beams to an information track on said information recording face, and
    wherein said carriage servo apparatus further comprises an applying device for applying said set drive signal to said moving device, when a value of an error signal indicating displacement of an emission position of said light beams relative to said information track is equal to or greater than a threshold set based on said determined value.

3. The carriage servo apparatus according to claim 1 or 2, wherein said drive signal determining device comprises:
    a stillness detecting device for detecting whether or not said carriage device is still; and
    a minimum drive signal applying device for, while changing a value of said drive signal in a state in which the carriage device is still, applying the drive signal to said moving device, and
    wherein the drive signal value applied when said stillness detecting device detects start of movement of said carriage device due to the applying of said drive signal is defined as said determined value.

4. The carriage servo apparatus according to claim 1 or 2, wherein said drive signal detecting device comprises:

a sensing device for sensing vibration of a light focusing device supported in said pickup device, said light focusing device focusing the light beams on said information recording face; and a minimum drive signal applying device for, while changing the value of said drive signal in a state in which the carriage device is still, applying the drive signal to said moving device, and wherein the value of the drive signal applied when said sensing device senses the vibration of said light focusing device along with the movement of said carriage device due to the applying of said drive signal is defined as said minimum value.

5. The carriage servo apparatus according to claim 2, wherein said setting device sets said error signal having a value equal to or greater than said threshold as said drive signal, and wherein said applying device applies said error signal set as the drive signal to said moving device.

6. The carriage servo apparatus according to claim 4, wherein said pickup device comprises a light receiving device for receiving reflection light of said light beams from said information recording face, and wherein said sensing device senses the vibration of said light focusing device due to change in emission position on said light receiving device for the reflection light.

7. An information reproduction apparatus comprising:

a carriage servo apparatus employed for reproduction of the information recorded on the information recording face; and a reproduction device;

wherein said carriage servo apparatus comprises:

a carriage device for supporting a pickup device for recording or reproducing information relevant to an information recording face;

a moving device for moving the carriage device in a direction parallel to said information recording face based on a drive signal;

a drive signal determining device for determining a value of said drive signal at a time when an increase in a level of the drive signal from a predetermined level causes the carriage device to initially move from a still state; and a setting device for setting said drive signal based on said determined value when the information is recorded or reproduced; and wherein said reproduction device is for reproducing said recorded information based on a detection signal from said pickup device, said detection signal corresponding to the information.

8. A carriage servo control method comprising a process for moving a carriage device for supporting a pickup device for recording or reproducing information relevant to an information recording face in a direction parallel to said information recording face by applying a drive signal to a moving device, wherein said carriage servo control method comprises:

a process of determining a value of said drive signal at a time when an increase in a level of the drive signal from a predetermined level causes said carriage device to initially move from a still state; and a process of setting said drive signal based on said determined value when said information is recorded or reproduced.

9. The carriage servo control method according to claim 8, wherein recording or reproducing said information is executed by emitting light beams to an information track on said information recording face, and wherein said carriage servo control method further comprises a process of applying said drive signal set to said moving device when a value of an error signal indicating displacement of an emission position of said light beams relative to said information track is equal to or greater than a threshold set based on said determined value.

10. The carriage servo control method according to claim 8 or 9, wherein said process of determining the value of the drive signal comprises: a process of, while changing a value of said drive signal in a state in which the carriage device is still, applying the drive signal to said moving device, in order to obtain said determined value, and wherein, when the start of movement of said carriage device due to the applying of said drive signal is detected, a value of the drive signal applied is determined as said determined value.

11. The carriage servo control method according to claim 8 or 9, wherein said process of detecting the minimum value of said drive signal comprises:

a process of sensing vibration of the light focusing device supported in said pickup device, said light focusing device focusing said light beams on said information recording face; and a process of, while changing the value of said drive signal in a state in which the carriage device is still, applying the drive signal to said moving device, and wherein, when vibration of said light focusing device along with movement of said carriage device due to the applying of said drive signal is sensed, a value of the drive signal applied is detected as said minimum value.

12. The carriage servo control method according to claim 11, wherein said pickup device comprises a light receiving device for receiving reflection light of said light beams from said information recording face, and wherein said process of sensing vibration of the light focusing device senses vibration of said light focusing device due to change in emission position on said light receiving device for said reflection light.

13. The carriage servo control method according to claim 9, wherein said process of setting the drive signal sets said error signal having a value equal to or greater than said threshold as said drive signal, and said process of applying the set drive signal to said moving device applies said error signal set as the drive signal to said moving device.

* * * * *